United States Patent
Yoon

(10) Patent No.: US 7,698,538 B2
(45) Date of Patent: Apr. 13, 2010

(54) METHOD AND APPARATUS FOR DOWNLOADING PROGRAM BY USING HAND SHAKING IN DIGITAL SIGNAL PROCESSING

(75) Inventor: Seong-Ho Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 10/339,155

(22) Filed: Jan. 9, 2003

(65) Prior Publication Data

US 2004/0010677 A1 Jan. 15, 2004

(30) Foreign Application Priority Data

Jul. 10, 2002 (KR) .................. 10-2002-0039911

(51) Int. Cl.
*G06F 7/38* (2006.01)
*G06F 9/00* (2006.01)
*G06F 9/44* (2006.01)
*G06F 15/00* (2006.01)

(52) U.S. Cl. ..................................... 712/225
(58) Field of Classification Search .................. 712/225
See application file for complete search history.

(56) References Cited

U.S. PATENT DOCUMENTS

| | | | | |
|---|---|---|---|---|
| 5,802,351 A * | 9/1998 | Frampton | ..................... | 703/27 |
| 6,327,648 B1 * | 12/2001 | Hedayat et al. | ................ | 712/35 |
| 6,460,164 B1 * | 10/2002 | Smith et al. | ..................... | 716/1 |
| 6,529,586 B1 * | 3/2003 | Elvins et al. | ............. | 379/88.13 |
| 6,575,362 B1 * | 6/2003 | Bator et al. | .................. | 235/381 |
| 6,606,677 B1 * | 8/2003 | Okbay et al. | ................. | 710/262 |
| 2003/0093491 A1 * | 5/2003 | Valjakka et al. | ............. | 709/214 |

* cited by examiner

*Primary Examiner*—Eddie P Chan
*Assistant Examiner*—Corey S Faherty
(74) *Attorney, Agent, or Firm*—F. Chau & Associates, LLC

(57) ABSTRACT

A method and apparatus are provided for downloading a program by using hand-shaking in a digital signal processor (DSP), in which the program stored at an external memory is downloaded to an internal memory by using the hand-shaking in an asynchronous system having a dual CPU, wherein current operation of the digital signal processor is temporarily held to shorten a downloading time.

11 Claims, 3 Drawing Sheets

METHOD AND APPARATUS FOR DOWNLOADING PROGRAM BY USING HAND SHAKING IN DIGITAL SIGNAL PROCESSING

BACKGROUND

1. Field of the Invention

The present invention relates to a method and apparatus for downloading a program in a digital signal processor (DSP), more particularly, a DSP having a dual CPU employing hand shaking.

2. Discussion of Related Art

At present, the number of handheld phone users is rapidly soaring and new products for various communicating systems and services are being introduced worldwide. New products includes Code Division Multiplex Access 2000 (CDMA 2000) and Wide-CDMA (W-CDMA) as third-generation communications. In Europe, GSM/GPRS products as the 2.5th generations have been developed successively. The third-generation communicating system requires high speed transmission, multimedia service and compatibility with other communication systems. As an example, a wireless terminal is supported by a dual mode, and related software requires several kinds of protocol stacks.

In these communication systems, a digital signal processor (DSP) is utilized to decentralize a load of a micro control unit (MCU). The DSP is a chip capable of performing a bootloading and requires a driving program to perform actual operation. Such a driving program can be downloaded from a program stored at a memory connected to the micro control unit (MCU), and storing it at an internal program memory.

A problem in such a conventional system is that much time is needed to download the stored program because the DSP has to be reset, and then the desired program is downloaded, and after the downloading is completed, the DSP needs to be reset again to execute the downloaded program.

SUMMARY OF THE INVENTION

The present invention is directed to a method and apparatus for downloading a program, which is capable of shortening the time for downloading the program stored at an external memory.

According to an embodiment of the present invention, a method and apparatus are provided for downloading a program by using hand-shaking in a digital signal processor (DSP), in which the program stored at an external memory is downloaded to an internal memory by using the hand-shaking in an asynchronous system having a dual CPU.

According to the embodiment of the present invention, an apparatus for downloading a program performing a specific function by using a hand-shaking in a DSP comprises an external memory for storing the program; a micro control unit (MCU) for controlling an overall operation of system by using a given program, ordering a downloading command when there is a downloading key command from the outside, and performing a control in downloading the program stored at the external memory when a downloading preparation signal is received; a direct memory access controller (DMAC) for receiving a control of the MCU and performing a control to directly access to the external memory; a program download control logic for receiving the downloading command from the MCU, standing by till an operation of the DSP in the midst of the current operation is completed according to an internal state, transferring the downloading preparation signal to the MCU when the operation of DSP is completed, and outputting a read/write mode selection control signal; a multiplexer (MUX) coupled with the DSP and the external memory for selecting a connection to the DSP or the external memory in response to the read/write mode selection control signal of the program download control logic; and an internal program memory connected to an output terminal of the MUX for storing the program stored at the external memory by the control of MCU.

According to another embodiment of the present invention, a method of downloading a program by using a hand-shaking in a DSP, comprises the steps of temporarily holding the current operation of the DSP through a hand-shaking when a downloading start command is inputted from the outside, and downloading and storing to an internal memory the program stored at an external memory.

Preferably, the operation of DSP held is resumed when the downloading is completed, and a DMAC is employed to make a downloading speed rapid in downloading the program.

According to another embodiment of the present invention, a method of downloading a program by using a hand-shaking in a DSP in a system having an MCU and the DSP, comprises the steps of: applying a downloading command from the MCU to a program download control logic when a downloading start command is inputted from the outside; temporarily holding the DSP by transferring a hold request signal from the program download control logic to the DSP; and accessing to the program stored at an external memory by the MCU when the DSP is held, and downloading the program to an internal memory.

BRIEF DESCRIPTION OF THE DRAWINGS

The embodiments of the present invention will become more apparent by the following descriptions of preferred embodiments taken in conjunction with the accompanying drawings, in which.

DETAILED DESCRIPTION OF PREFERRED EMBODIMENTS

Hereinafter, preferred embodiments of the present invention will be described in detail with reference to the accompanying drawings.

Figure 1:
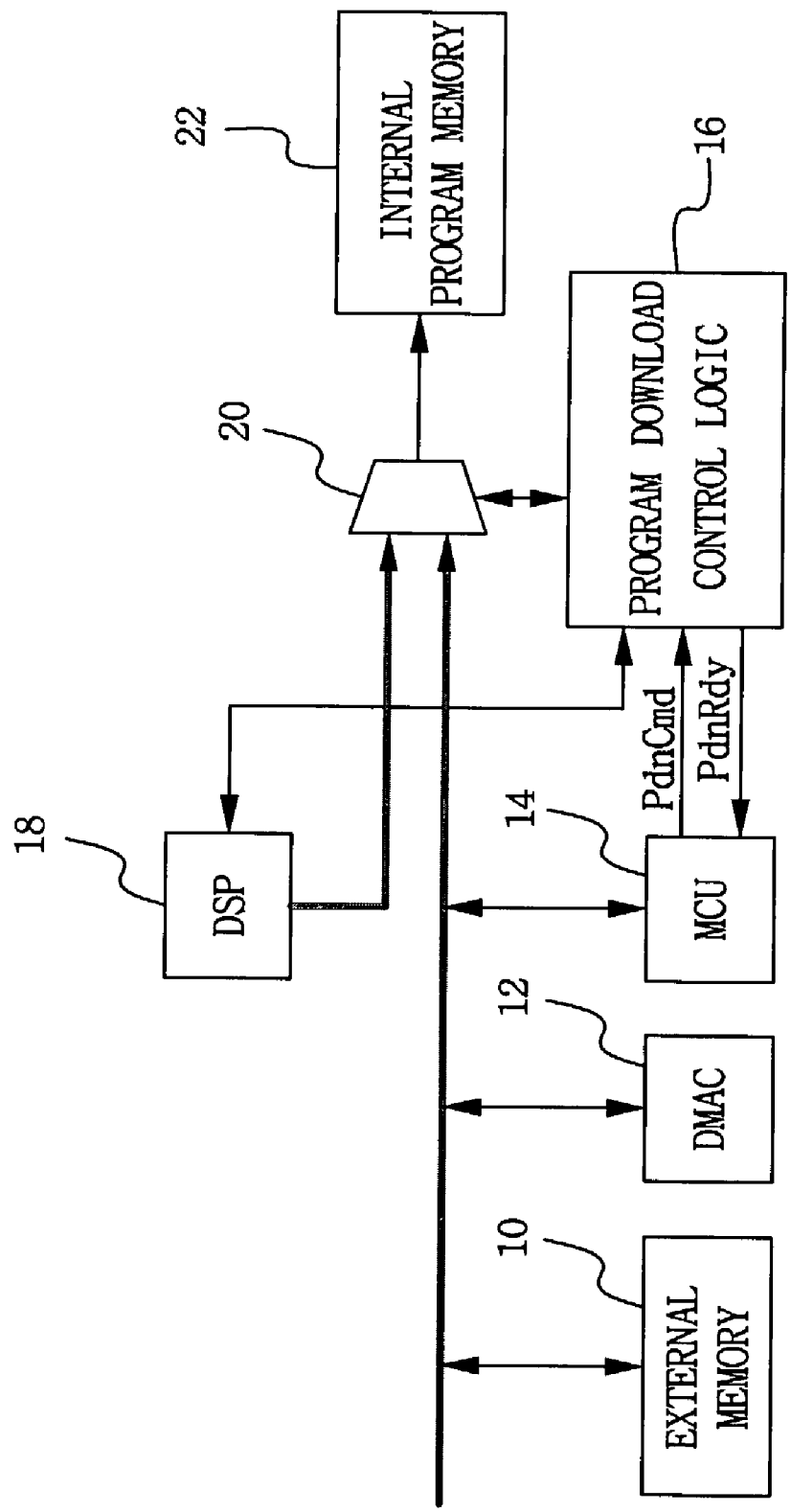
FIG. 1 is a schematic block diagram of an apparatus for downloading a program in a preferred embodiment of the present invention.

FIG. 1 is a schematic block diagram of an apparatus for downloading a program by using hand-shaking in a digital signal processing(DSP) system.

According to an embodiment of the present invention, an apparatus for downloading a program for performing a specific function using hand-shaking in a DSP includes an external memory 10 for storing the program; a direct memory access controller (DMAC) 12 for controlling access to the external memory 10; a micro control unit (MCU) 14 for controlling the overall operation of the system, including ordering a downloading command when an external downloading key is present, and performing downloading of the program stored at the external memory 10; a program download control logic 16 for receiving the downloading command from the MCU 14, standing by till the current operation of the DSP 18 is completed according to an internal state, transferring a downloading preparation signal to the MCU 14 when the operation of the DSP is completed, and outputting a read/write mode selection control signal; a multiplexer (MUX) 20 connected to the DSP 18 and the external memory 10 for selecting a connection to the DSP 18 or the external memory 10 in response to the read/write mode selection control signal of the program download control logic 16; and an internal program memory 22 connected to an output terminal of the MUX 20 for storing the program stored at the external memory 10 by the control of MCU 14.

Figure 2:
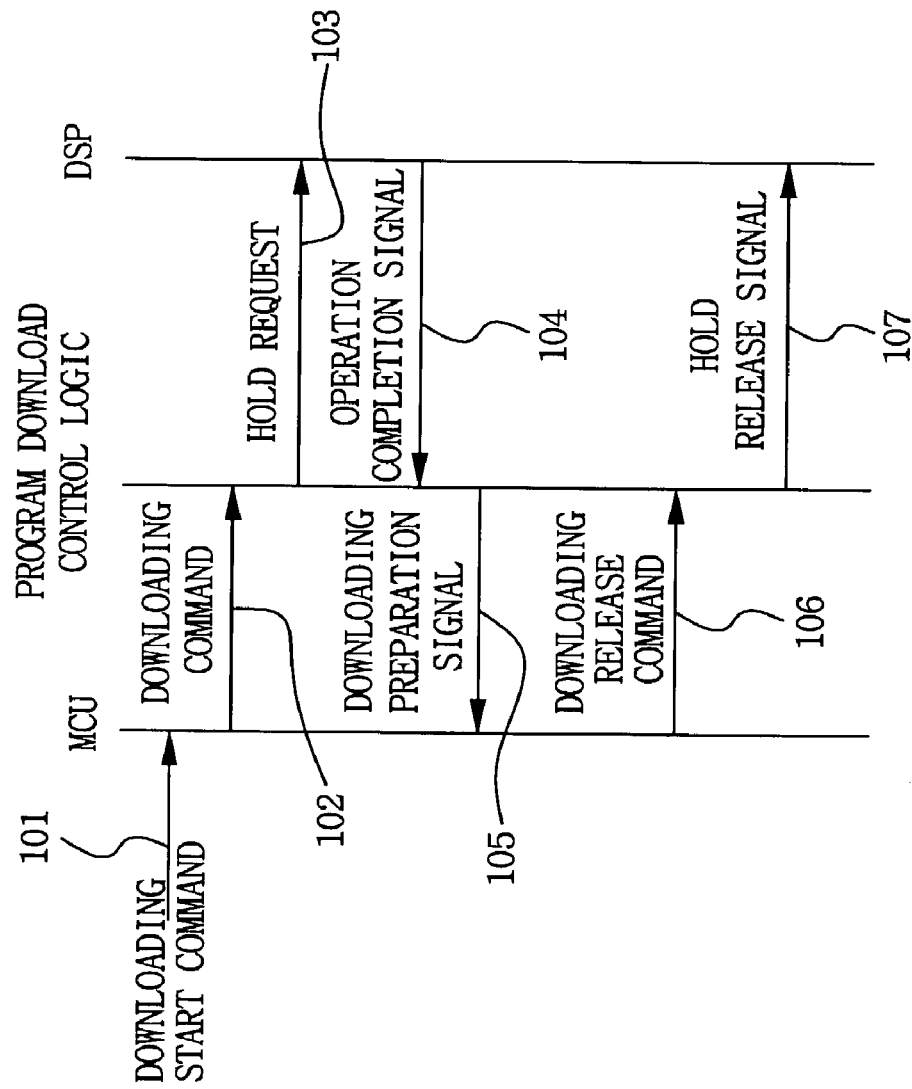
FIG. 2 is a flowchart showing a process of downloading a program in a preferred embodiment of the present invention.

FIG. 2 is a flowchart showing the downloading of a program in a preferred embodiment of the present invention.

Figure 3:
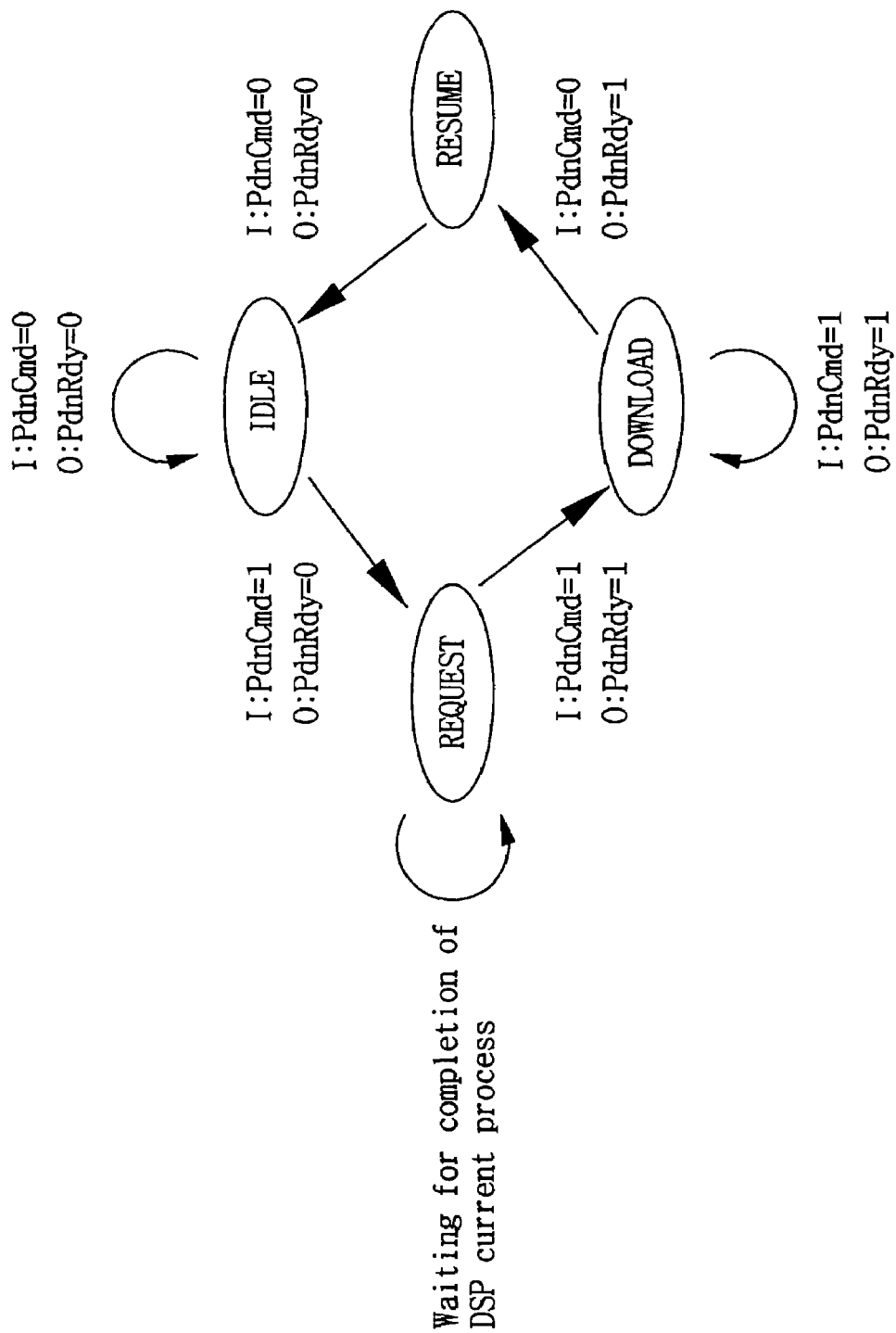
FIG. 3 is a state diagram of a program download control logic in a preferred embodiment of the present invention.

FIG. 3 is a state diagram of a program download control logic in a preferred embodiment of the present invention.

An IDLE state is generally a stand-by state in which a program downloading command PdnCmd=0, and a REQUEST state is a state where the program downloading command PdnCmd=1 is received and held till the current operation of the DSP 18 is completed. A DOWNLOAD state is to output an acknowledgement signal PdnRdy=1 to perform downloading by the MCU 14 when the downloading preparation is completed. A RESUME state is a preparation state to resume the operation of the DSP 18 discontinued when the downloading is completed and a downloading release signal PdnCmd=0 is received.

A downloading operation in a preferred embodiment of the present invention will be described with reference to FIGS. 1 to 3.

In the operation of downloading a specific program stored at the external memory to the internal memory in the system having a dual CPU such as the MCU 14 and the DSP 18, a key of key manipulating part(not shown) is first manipulated by a user to input a key command to start downloading (step 101). When the key command is inputted, the MCU 14 receives the key command as an interrupt command to generate a code for a downloading in an interrupt service routine, and the program downloading command signal PdnCmd=1 is sent to the program download control logic 16 (step 102).

When the program download control logic 16 is under the IDLE state as shown in the program download logic state diagram of FIG. 3 and the program downloading command signal PdnCmd=1 is received, the program download control logic 16 sends a hold request command HOLD REQUET to the DSP 18 and it is changed to the REQUEST state waiting for a completion of the DSP 18 operation (step 103). Then, the DSP 18 transfers an operation completion signal to the program download control logic 16 when the current operation of DSP is completed (step 104). The program download control logic 16 is then changed to the DOWNLOAD state to send the program downloading preparation signal PdnRdy=1 to the MCU 14 (step 105).

The program download control logic 16 further sends a write mode selection control signal to the MUX 20 to be connected to a bus coupled with the external memory 10. Then, the MCU 14, which now has the authority to perform the downloading, downloads the program stored at the external memory 10 to the internal program memory 22 through the MUX 20, and stores it at the internal program memory 22. At this time, the MCU 14 may control the DMAC 12 so that the program stored at the external memory 10 is transferred directly to the internal program memory 22, separately from the MCU 14, to thereby make faster the downloading process. When such downloading is completed, the MCU 14 transmits the program downloading release signal PdnCmd=0 to the program download control logic 16 (step 106).

When the program download control logic 16 receives the program downloading release signal PdnCmd=0, it is changed to the RESUME state to generate and apply a read mode selection control signal to the MUX 20, and to apply a hold release signal to the DSP 18 for resuming the operation of the DSP 18 (step 107).

The MUX 20 connects the DSP 18 with the internal program memory 22 in response to the read mode selection control signal outputted from the program download control logic 16. The program download control logic 16 is provided with a retiming logic. According to this embodiment, the MCU 14 operates based on a 39 MHz clock and the DSP 18 operates based on a 65 MHz clock, the MCU 14 and the DSP 18 operate asynchronously. Therefore, retiming logic of the program download control logic 16 is used to have an interface signal between the MCU 14 and the DSP 18 synchronized.

As afore-mentioned, according to preferred embodiments of the present invention, a hand-shaking method is employed between an MCU and a DSP to download a program stored at an external memory to an internal program memory in a system having a dual CPU. A program download control logic is used to hold the DSP temporarily and progress a program downloading. The DSP held under the holding state is reset to resume its operation when the program downloading is completed. With this configuraiton, the program can be downloaded to the internal memory even in the midst of the DSP's operation so that a downloading time is shortened.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. An apparatus for downloading a program in a system having a digital signal processor (DSP), comprising:

an external memory for storing the program;

a micro control unit (MCU) for controlling an overall operation of the system, sending a downloading command when a downloading key command is received from an external source, the downloading key command indicating a request to begin downloading of the program, and performing downloading of the program stored in the external memory when a downloading preparation signal is received;

a program download control logic for receiving the downloading command from the MCU and in response to the downloading command, sending a hold request signal to the DSP and standing by till an operation completion signal is received from the DSP in response to the hold request signal, and transferring the downloading preparation signal to the MCU in response to the operation completion signal, and outputting a read/write mode selection control signal; and a multiplexer (MUX) connected with the DSP and the external memory for selecting a connection to the DSP or the external memory in response to the read/write mode selection control signal of the program download control logic; and an internal memory connected to an output of the multiplexer (MUX) for receiving and storing the downloaded program.

2. The apparatus of claim 1, further comprising a direct memory access controller (DMAC) for performing direct access to the external memory.

3. A method of downloading a program in a system having a micro control unit (MCU) and a DSP, said method comprising the steps of:
- applying by the MCU a downloading command to a program download control logic when a downloading start command is input from an external source, the start command indicating a request to begin downloading of the program;
- applying by the program download control logic a hold request signal to the DSP in response to the downloading command;
- completing a current process of the DSP and temporarily holding a subsequent process of the DSP in response to the hold request signal, and outputting an operation completion signal from the DSP to the program download control logic to indicate that the DSP has completed the current process;
- sending a downloading preparation signal from the program download control logic to the MCU and sending a selection control signal from the program download control logic in response to the operation completion signal,
- wherein the selection control signal enables a first connection between the external memory and the internal memory and disables a second connection between the DSP and the external memory; and
- the MCU downloading the program from an external memory to the internal memory through the first connection in response to the downloading preparation signal.

4. The method of claim 3, wherein said step of downloading includes using a direct memory access controller (DMAC).

5. The method of claim 4, further comprising the steps of:
- sending a hold release signal from the program download control logic to the DSP; and
- resuming the subsequent process of the DSP held, when a downloading release command from the MCU is sent to the program download control logic.

6. The apparatus of claim 1, wherein the DSP generates the operation completion signal in response to completing a current DSP operation and holds a subsequent DSP operation in response to receiving the hold request signal.

7. The apparatus of claim 1, wherein the MCU and DSP each comprise a CPU.

8. The apparatus of claim 1, wherein the MCU sends the downloading command in an interrupt service routine.

9. The apparatus of claim 1, wherein the MCU downloads the program from the external memory to the internal memory through the multiplexer.

10. The apparatus of claim 1, wherein the MCU operates based on a 39 MHz clock and the DSP operates based on a 65 MHz clock.

11. The apparatus of claim 1, wherein the MCU and the DSP operate asynchronously from one another.

* * * * *